United States Patent
Okajima et al.

(10) Patent No.: US 12,012,479 B2
(45) Date of Patent: Jun. 18, 2024

(54) POLYURETHANE RESIN HAVING SATISFACTORY ADHESIVE PROPERTY, AND ADHESIVE COMPOSITION USING THE SAME

(71) Applicant: TOYOBO CO., LTD., Osaka (JP)

(72) Inventors: Hiroki Okajima, Shiga (JP); Katsuya Shimeno, Shiga (JP)

(73) Assignee: TOYOBO MC CORPORATION, Osaka (JP)

( * ) Notice: Subject to any disclaimer, the term of this patent is extended or adjusted under 35 U.S.C. 154(b) by 553 days.

(21) Appl. No.: 17/284,922

(22) PCT Filed: Nov. 13, 2019

(86) PCT No.: PCT/JP2019/044492
§ 371 (c)(1),
(2) Date: Apr. 13, 2021

(87) PCT Pub. No.: WO2020/116109
PCT Pub. Date: Jun. 11, 2020

(65) Prior Publication Data
US 2021/0380754 A1  Dec. 9, 2021

(30) Foreign Application Priority Data
Dec. 3, 2018  (JP) .................. 2018-226680

(51) Int. Cl.
| | |
|---|---|
| *C08G 18/76* | (2006.01) |
| *C08G 18/44* | (2006.01) |
| *C08G 18/73* | (2006.01) |
| *C08G 18/75* | (2006.01) |
| *C09J 175/04* | (2006.01) |

(52) U.S. Cl.
CPC ......... *C08G 18/7657* (2013.01); *C08G 18/44* (2013.01); *C08G 18/73* (2013.01); *C08G 18/753* (2013.01); *C09J 175/04* (2013.01)

(58) Field of Classification Search
CPC .. C08G 18/7657; C08G 18/44; C08G 18/753; C08G 18/73; C09J 174/04

USPC .......................................................... 524/590
See application file for complete search history.

(56) References Cited

U.S. PATENT DOCUMENTS

2014/0303330 A1* 10/2014 Kanagawa ........... C08G 18/758
525/454

FOREIGN PATENT DOCUMENTS

| JP | 2012-52103 | | 3/2012 |
|---|---|---|---|
| JP | 2012052103 A | * | 3/2012 |
| JP | 2013-245312 | | 12/2013 |
| JP | 2015-78274 | | 4/2015 |
| JP | 2015078274 A | * | 4/2015 |
| JP | 2016-204465 | | 12/2016 |
| JP | 2018-62538 | | 4/2018 |
| JP | 2018-177861 | | 11/2018 |
| WO | 2015/174187 | | 11/2015 |

OTHER PUBLICATIONS

Translation of JP 2015-078274 (patents application 2013-215012), Apr. 23, 2015. (Year: 2015).*
Translation of JP 2012-052103 (patents application 2011-168166), Mar. 15, 2012. (Year: 2012).*
International Search Report (ISR) issued Feb. 18, 2020 in International (PCT) Application No. PCT/JP2019/044492.
Extended European Search Report issued Jul. 4, 2022, in corresponding European Patent Application No. 19893901.9.

* cited by examiner

*Primary Examiner* — Hui H Chin
(74) *Attorney, Agent, or Firm* — Wenderoth, Lind & Ponack, L.L.P.

(57) ABSTRACT

Disclosed herein is a polyurethane resin containing, as copolymerization components, a polycarbonate polyol (A), an organic diisocyanate (B) and a chain extender (C), wherein the polycarbonate polyol (A) contains a specific structure in an amount of 60 mol % or more and a glass transition temperature of the polyurethane resin is 50° C. or higher. The polyurethane resin has excellent heat resistance and satisfactory adhesive property to various substrates, and is usable as an adhesive composition.

6 Claims, No Drawings

POLYURETHANE RESIN HAVING SATISFACTORY ADHESIVE PROPERTY, AND ADHESIVE COMPOSITION USING THE SAME

TECHNICAL FIELD

The present invention relates to: a polyurethane resin which contains a polycarbonate diol having a specific framework and an organic diisocyanate and has satisfactory adhesive property to various substrates; and an adhesive composition using the resin.

BACKGROUND ART

Heretofore, a polyurethane resin has been used widely as an adhesive agent for a substrate, e.g., a polyethylene terephthalate film and a polycarbonate film. This is because a polyurethane resin can be designed in a wide range with respect to the physical properties, forms and curing modes thereof and has excellent chemical properties including chemical resistance (Patent Document 1).

PRIOR ART DOCUMENT

Patent Document

Patent Document 1: Japanese Patent Application Laid-Open (JP-A) No. 2013-245312

DISCLOSURE OF THE INVENTION

Problem that the Invention is to Solve

The above-mentioned adhesive agent contains a large quantity of linear aliphatic frameworks in the constituents thereof and, as a result, can make a coating film flexible and can have improved reactivity. However, due to the flexibility, there is a problem that the adhesive agent may flow out or may be decomposed, for example, upon an application of a thermal load or during a hot water treatment and thereby may be deteriorated in adhesive property. Furthermore, the types of substrates to which the adhesive agent can exert adhesive property are limited, and therefore there is another problem that substrate selectivity is narrow.

The present invention has been made in order to solve the above-mentioned problems. That is, the present invention relates to: a polyurethane resin having excellent heat resistance and satisfactory adhesive property to various substrates; and an adhesive composition using the resin.

Means for Solving the Problem

The present inventors have made various studies on the above-mentioned factors. As a result, it is found that an adhesive composition which is prepared using a polyurethane resin containing a polycarbonate diol having a specific framework as a main raw material has excellent adhesive property to various substrates and excellent heat resistance. This finding leads to the accomplishment of the present invention. Thus, the present invention comprises the following constitutions.

A polyurethane resin containing, as copolymerization components, a polycarbonate polyol (A), an organic diisocyanate (B) and a chain extender (C), characterized in that the polycarbonate polyol (A) contains a structure represented by the following general formula (1) in an amount of 60 mol % or more and that a glass transition temperature of the polyurethane resin is 50° C. or higher.

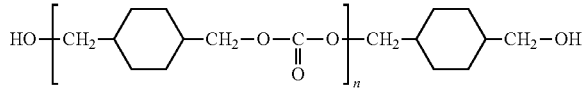

(In the general formula (1), n represents an integer of 1 to 20.)

The organic diisocyanate (B) is preferably isophorone diisocyanate, 4,4'-diphenylmethane diisocyanate or hexamethylene diisocyanate. The chain extender (C) is preferably a glycol compound having 7 or less carbon atoms.

An adhesive composition comprising the polyurethane resin and a crosslinking agent.

Advantages of the Invention

The polyurethane resin and the adhesive composition according to the present invention have excellent adhesive property to various substrates and also have excellent heat resistance and flowability, and are therefore suitable as a binder for screen inks, a binder for decorative molding use and the like.

BEST MODE FOR CARRYING OUT THE INVENTION

The polyurethane resin of the present invention contains, as copolymerization components, a polycarbonate polyol (A), an organic diisocyanate (B) and a chain extender (C).

<Polycarbonate Polyol (A)>

The polycarbonate polyol (A) to be used in the present invention is required to contain a structure represented by the general formula (1). More specifically, the polycarbonate polyol (A) is required to contain the structure represented by the general formula (1) in an amount of 60 mol % or more when the whole amount of the polycarbonate polyol (A) is taken as 100 mol %. This amount is preferred to be 70 mol % or more, more preferred to be 75 mol % or more, further preferred to be 80 mol % or more, furthermore preferred to be 90 mol % or more, and particularly preferred to be 95 mol % or more. It may be 100 mol %. When the structure represented by the general formula (1) is contained in the polycarbonate polyol (A) as above, the polyurethane resin can be imparted with flexibility and can exert excellent adhesive property and heat resistance.

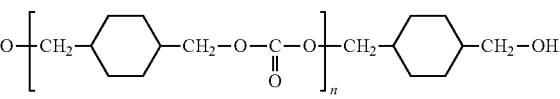

In the general formula (1), n represents an integer of 1 to 20; n is preferred to be 2 or more, further preferred to be 3 or more, and furthermore preferred to be 5 or more; and n is preferred to be 18 or less, further preferred to be 15 or less, and furthermore preferred to be 10 or less. When the value for n falls within the above-mentioned range, cohesive force of the resultant polyurethane resin can be improved and the resultant polyurethane resin can exert excellent adhesive property and heat resistance.

As to a polycarbonate polyol (A) other than the polycarbonate polyol having the structure represented by the general formula (1), an aliphatic polycarbonate polyol, an alicyclic polycarbonate polyol or an aromatic polycarbonate polyol can be used. The content of these polycarbonate polyols is preferred to be 40 mol % or less when the whole amount of the polycarbonate polyol (s) (A) is taken as 100 mol %. This content is preferred to be 30 mol % or less, further preferred to be 20 mol % or less, furthermore preferred to be 10 mol % or less, and particularly preferred to be 5 mol % or less. It may be 0 mol %.

The aliphatic polycarbonate polyol is not particularly limited, and a polycarbonate diol produced by the reaction of a linear or branched aliphatic glycol, e.g., butanediol, pentanediol, hexanediol, polycaprolactone, polytetramethylene glycol, propylene glycol, and neopentyl glycol, with a carbonic acid diester or the like can be used. The alicyclic polycarbonate polyol is not particularly limited, and a polycarbonate diol produced by the reaction of an alicyclic glycol, e.g., isosorbide, with a carbonic acid diester or the like can be used. The aromatic polycarbonate diol is not particularly limited, and a polycarbonate diol produced by the reaction of an aromatic glycol, e.g., benzenedimethanol and naphthalenedimethanol, with a carbonic acid diester or the like can be used. A polycarbonate diol produced from a combination of one or more of the above-mentioned glycols as raw materials can also be used.

The number-average molecular weight of the polycarbonate polyol (A) is preferred to be 300 to 2,500, and more preferred to be 500 to 1,500. When the number-average molecular weight is adjusted to a value equal to or more than the lower limit value, cohesive force of the resultant polyurethane resin can be improved and the resultant polyurethane resin can exert excellent adhesive property and heat resistance. When the number-average molecular weight is adjusted to a value equal to or less than the upper limit, it becomes possible to secure the number of urethane bonds appropriately and can exert excellent adhesive property and heat resistance.

The number-average molecular weight of the polycarbonate diol (A) is calculated in accordance with the following formula:

Number-average molecular weight=(56.1×1000× (number of valency))/(hydroxyl value [mgKOH/g])

In the formula, the number of valency is a number of hydroxyl groups per molecule, and [mgKOH/g] is a unit for the hydroxyl value.

<Organic Diisocyanate (B)>

Examples of the organic diisocyanate (B) to be used in the present invention include: an aliphatic diisocyanate such as tetramethylene diisocyanate, hexamethylene diisocyanate (HDI), 2-methyl-1,5-pentane diisocyanate, decamethylene diisocyanate, 3-methyl-1,5-pentane diisocyanate, and lysine diisocyanate; an alicyclic diisocyanate such as isophorone diisocyanate (IPDI), hydrogenated tolylene diisocyanate, hydrogenated diphenylmethane diisocyanate, hydrogenated xylylene diisocyanate, hydrogenated tetramethylxylylene diisocyanate and cyclohexyl diisocyanate; and an aromatic diisocyanate such as 2,4-tolylene diisocyanate, 2,6-tolylene diisocyanate, 4,4'-diphenylmethane diisocyanate (MDI), 2,4'-diphenylmethane diisocyanate, 2,2'-diphenylmethane diisocyanate, 1,5-naphthylene diisocyanate, 1,4-naphthylene diisocyanate, o-phenylene diisocyanate, p-phenylene diisocyanate, m-phenylene diisocyanate, o-xylylene diisocyanate, m-xylylene diisocyanate, p-xylylene diisocyanate, tetramethylxylylene diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, and 3,3'-dimethoxydiphenyl-4,4'-diisocyanate. In addition, a mixture of two or more of these organic diisocyanates, and a urethane-modified product, an allophanate-modified product, a urea-modified product, a biuret-modified product, a urethodione-modified product, a uretonimine-modified product, an isocyanurate-modified product, and a carbodiimide-modified product of any one of these organic diisocyanates can also be mentioned. Examples of the organic diisocyanate preferable in the present invention is hexamethylene diisocyanate, isophorone diisocyanate, or 4,4'-diphenylmethane diisocyanate. Further, among these compounds, isophoronediisocyanate is especially preferred because the solubility of the polyurethane resin in solvents becomes good, the risk of the gelatinization of the polyurethane resin during production can be reduced, and the weather resistance and mechanical strength of the polyurethane resin can become superior.

The amount of the organic diisocyanate (B) to be copolymerized is preferred to be 1 part by mass or more relative to 100 parts by mass of the polycarbonate polyol (A). This amount is further preferred to be 2 parts by mass or more, furthermore preferred to be 5 parts by mass or more, and particularly preferred to be 10 parts by mass or more. Further, this amount is preferred to be 60 parts by mass or less, further preferred to be 50 parts by mass or less, furthermore preferred to be 45 parts by mass or less, and particularly preferred to be 40 parts by mass or less. When the amount of the organic diisocyanate (B) to be copolymerized is adjusted to a value falling within the above-mentioned range, it becomes possible to produce a polyurethane resin having excellent adhesive property and heat resistance.

<Chain Extender (C)>

The chain extender (C) to be used in the present invention is not particularly limited, as long as it can extend the molecule chain of the polyurethane resin. The chain extender (C) is preferably a compound having a group capable of reacting with the organic diisocyanate (B). The chain extender (C) is not particularly limited. From the viewpoint of the occurrence of gelatinization during production and reactivity, the chain extender (C) is preferably a polyol compound, more preferably a glycol compound. The glycol compound may be either one of an aliphatic glycol compound, an aromatic glycol compound or an alicyclic glycol compound, and is preferably an aliphatic glycol compound. Among aliphatic glycol compounds, a linear or branched aliphatic glycol compound having 10 or less carbon atoms is preferred, and a linear or branched aliphatic glycol compound having 7 or less carbon atoms is further preferred. The lower limit is not particularly limited, and a linear or branched aliphatic glycol compound having 2 or more carbon atoms is preferred, and a linear or branched aliphatic glycol compound having 3 or more carbon atoms is further preferred. Specific examples include ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 2-ethyl-4-butyl-1,3-propanediol, diethylene glycol, dipropylene glycol, and neopentyl glycol. In the present invention, from the viewpoint of reactivity and heat resistance, neopentyl glycol or 1,6-hexanediol is preferred.

The amount of the chain extender (C) to be copolymerized is preferred to be 1 part by mass or more relative to 100 parts by mass of the polycarbonate polyol (A). This amount is further preferred to be 2 parts by mass or more, furthermore preferred to be 3 parts by mass or more, and particularly preferred to be 4 parts by mass or more. Further, this amount is preferred to be 20 parts by mass or less, further preferred to be 15 parts by mass or less, furthermore preferred to be 10 parts by mass or less, and particularly preferred to be 8 parts by mass or less. When the amount of the chain extender (C) to be copolymerized is adjusted to a value falling within the above-mentioned range, it becomes possible to produce a polyurethane resin having excellent adhesive property and heat resistance.

<Polyurethane Resin>

The glass transition temperature of the polyurethane resin of the present invention is required to be 50° C. or higher. This glass transition temperature is preferred to be 55° C. or higher, and further preferred to be 60° C. or higher. When the glass transition temperature of the polyurethane resin is adjusted to a temperature equal to or higher than the lower limit value, it becomes possible to prevent the deterioration in adhesive property to substrates due to thermal load and prevent the occurrence of flowing out. This glass transition temperature is preferred to be 120° C. or lower, further preferred to be 110° C. or lower, furthermore preferred to be 100° C. or lower, and particularly preferred to be 95° C. or lower. When the glass transition temperature of the polyurethane resin is adjusted to a temperature equal to or lower than the upper limit value, it becomes possible to prevent the deterioration in adhesive property to substrates.

The number-average molecular weight of the polyurethane resin of the present invention is preferred to be 5,000 to 50,000, further preferred to be 8,000 to 30,000, and furthermore preferred to be 12,000 to 22,000. When the number-average molecular weight is adjusted to a value equal to or more than the lower limit value, it becomes possible to prevent the deterioration in adhesive property due to the deterioration in cohesive force of the polyurethane resin or the deterioration in adhesive property to substrates due to thermal load. When the number-average molecular weight is adjusted to a value equal to or less than the upper limit value, it becomes possible to prevent the increase in viscosity of a solution of the polyurethane resin (i.e., a varnish) which leads to the handling easiness of the polyurethane resin.

The total amount of the polycarbonate polyol (A), the organic diisocyanate (B), and the chain extender (C) is preferred to be 80 mass % or more when the amount of the polyurethane resin is taken as 100 mass %. The total amount is further preferred to be 90 mass % or more, furthermore preferred to be 95 mass % or more, and particularly preferred to be 99 mass % or more. It may be 100 mass %. When the total amount falls within this range, it becomes possible to achieve excellent adhesive property and heat resistance.

With respect to the method for synthesizing the polyurethane resin to be used in the present invention, the polycarbonate diol (A) having a specific framework, the organic diisocyanate (B), and the chain extender (C) may be charged together at once into a reaction vessel or may be charged in divided portions into a reaction vessel. With respect to the total of hydroxyl values in the polycarbonate diol (A) and the chain extender (C) and the total amount of the isocyanate groups in the organic diisocyanate (B) in the system, it is preferred that the reaction is carried out under a condition wherein a functional group ratio "(isocyanate groups)/(hydroxyl groups)" is 1 or less. The functional group ratio is further preferred to be 0.99 or less, and furthermore preferred to be 0.98 or less. Further, the functional group ratio is preferred to be 0.90 or more, further preferred to be 0.94 or more, and furthermore preferred to be 0.96 or more. By carrying out the reaction in the presence or absence of a solvent that is inert against an isocyanate group, the polyurethane resin can be produced stably. Examples of the solvent include, but are not limited to: an ester-based solvent (e.g., ethyl acetate, butyl acetate, ethyl butyrate), an ether-based solvent (e.g., dioxane, tetrahydrofuran, diethyl ether), a ketone-based solvent (e.g., cyclohexanone, methyl ethyl ketone, methyl isobutyl ketone), an aromatic hydrocarbon-based solvent (e.g., benzene, toluene, xylene), and a mixed solvent thereof. As to a reaction device, a reaction vessel (reaction can) equipped with a stirring device as well as a mixing/kneading device (e.g., a kneader, a twin-screw extruder) can be used.

In order to accelerate the urethanization reaction as mentioned above, a catalyst which has been used in the conventional urethanization reactions can be used. As to the catalyst, a tin-based catalyst (e.g., trimethyltin laurate, dimethyltin laurate, trimethyltin hydroxide, dimethyltin hydroxide, stannous octoate), a bismuth-based catalyst, a lead-based catalyst (e.g., lead oleate, lead-2-ethylhexoate), an amine-based catalyst (e.g., triethylamine, tributylamine, morpholine, diazabicyclooctane) and the like can be used. These catalysts may be used singly, or two or more of them may be used in combination.

<Crosslinking Agent>

The crosslinking agent to be used in the present invention is not particularly limited, as long as the crosslinking agent can react with the polyurethane resin to cause crosslinking in the polyurethane. The crosslinking agent is preferably a compound having two or more functional groups per molecule. Examples of the functional group include an isocyanate group, an epoxy group, an amino group, a methylol group, an alkoxymethyl group, an imino group, a metal chelate group, and an aziridinyl group. Specific examples of the compound include a polyfunctional isocyanate compound, a polyfunctional epoxy compound, a polyfunctional melamine compound, a metal crosslinking agent and a polyfunctional aziridine compound.

The polyfunctional isocyanate compound is a compound having two or more isocyanate groups per molecule. Specific examples of the polyfunctional isocyanate compound include: a diisocyanate compound such as tolylene diisocyanate (TDI), 4,4'-diphenylmethane diisocyanate (MDI), hexamethylene diisocyanate, ortho-xylylene diisocyanate, meta-xylylene diisocyanate, para-xylylene diisocyanate, 1,5-naphthalene diisocyanate, 1,4-naphthalene diisocyanate, 1,8-naphthalene diisocyanate, hydrogenated diphenylmethane diisocyanate, hydrogenated tolylene diisocyanate, hydrogenated xylylene diisocyanate, and isophorone diisocyanate; a polyisocyanate compound formed from any one of these compounds; and a urethane-modified product, an allophanate-modified product, a urea-modified product, a biuret-modified product, a urethodione-modified product, a uretonimine-modified product, an isocyanurate-modified product, and a carbodiimide-modified product of any one of the organic diisocyanates. These compounds may be used singly, or two or more of them may be used in combination.

The polyfunctional epoxy compound is a compound having two or more epoxy groups per molecule. Specific examples of the polyfunctional epoxy compound include: a diglycidyl ether of an aliphatic diol such as 1,6-hexanediol, neopentyl glycol, and polyalkylene glycol; a polyglycidyl ether of an aliphatic polyol such as sorbitol, sorbitan, polyglycerol, pentaerythritol, diglycerol, glycerol, and trimethylol propane; a polyglycidyl ether of an alicyclic polyol such as cyclohexanedimethanol; and a diglycidyl ester or a polyglycidyl ester of an aliphatic or aromatic polycarboxylic acid such as terephthalic acid, isophthalic acid, naphthalenedicarboxylic acid, trimellitic acid, adipic acid, and sebacic acid. Examples of the polyfunctional epoxy compound also include: a diglycidyl ether or a polyglycidyl ether of a polyhydric phenol such as resorcinol, bis(p-hydroxyphenyl)methane, 2,2-bis(p-hydroxyphenyl)propane, tris(p-hydroxyphenyl)methane, and 1,1,2,2-tetrakis(p-hydroxyphenyl)ethane; an N-glycidyl derivative of an amine, such as N,N-diglycidylaniline, N,N-diglycidyltoluidine, and N,N,N',N'-tetraglycidyl-bis-(p-aminophenyl)methane; a triglycidyl derivative of amino phenol; triglycidyl tris(2-hydroxyethyl) isocyanurate; triglycidyl isocyanurate; an ortho-cresol-type epoxy; a phenol-novolac-type epoxy; and a bisphenol-type polyfunctional epoxy compound. These compounds may be used singly, or two or more of them may be used in combination.

Examples of the metal crosslinking agent include metal chelate compounds each having such a structure that acetylacetone, methyl acetoacetate, ethyl acetoacetate, ethyl lactate, methyl salicylate or the like is coordinated with a metal such as aluminum, zinc, cadmium, nickel, cobalt, copper, calcium, barium, titanium, manganese, iron, lead, zirconium, chromium, and tin. These compounds may be used singly, or two or more of them may be used in combination.

The polyfunctional aziridine compound is a compound having two or more aziridine groups per molecule. Specific examples of the polyfunctional aziridine compound include N,N'-hexamethylene-1, 6-bis(1-aziridinecarboxamide), trimethylolpropane-tri-β-aziridinyl propionate, bisisophthaloyl-1-(2-methylaziridine), tris-(1-aziridinyl) phosphine oxide and N,N'-diphenylethane-4,4'-bis(1-aziridinecarboxamide). These compounds may be used singly, or two or more of them may be used in combination.

The crosslinking agent is preferably a polyfunctional isocyanate compound. The crosslinking agent is more preferably xylylene diisocyanate or a modified product thereof.

The content of the crosslinking agent is preferred to be 1 part by mass or more relative to 100 parts by mass of the polyurethane resin. This content is further preferred to be 2 parts by mass or more, and furthermore preferred to be 3 parts by mass or more. Further, this content is preferred to be 30 parts by mass or less, further preferred to be 25 parts by mass or less, and furthermore preferred to be 20 parts by mass or less. When the content of the crosslinking agent is adjusted to a value falling within the above-mentioned range, the polyurethane resin can exert excellent adhesive property and heat resistance.

<Adhesive Composition>

The adhesive composition of the present invention is a composition comprising the polyurethane resin and the crosslinking agent. The content of the polyurethane resin in a solid matter of the adhesive composition is preferred to be 60 mass % or more, further preferred to be 70 mass % or more, and furthermore preferred to be 80 mass % or more. Further, this content is preferred to be 98 mass % or less, further preferred to be 95 mass % or less, and furthermore preferred to be 93 mass % or less. When the content of the polyurethane resin is adjusted to a value falling within the above-mentioned range, the polyurethane resin can exert excellent adhesive property and heat resistance.

The adhesive composition of the present invention may be diluted with an organic solvent to prepare a varnish. Examples of the organic solvent include, but are not limited to, an ester-based solvent (e.g., ethyl acetate, butyl acetate, ethyl butyrate), an ether-based solvent (e.g., dioxane, tetrahydrofuran, diethyl ether), a ketone-based solvent (e.g., cyclohexanone, methyl ethyl ketone, methyl isobutyl ketone), an aromatic hydrocarbon-based solvent (e.g., benzene, toluene, xylene), and a mixed solvent thereof. The content of the organic solvent is preferred to be 50 parts by mass or more relative to 100 parts by mass of the polyurethane resin. This content is further preferred to be 100 parts by mass or more, and furthermore preferred to be 200 parts by mass or more. Further, this content is preferred to be 2,000 parts by mass or less, further preferred to be 1,000 parts by mass or less, and furthermore preferred to be 500 parts by mass or less. When the content of the organic solvent falls within the above-mentioned range, the storage stability of the adhesive composition can become satisfactory and the coatability of the adhesive composition onto substrates can be improved. Furthermore, this content is advantageous from the viewpoint of cost.

The adhesive composition may contain known additives such as an ultraviolet ray absorber, an antioxidant agent, a flame retardant, and a filler, as long as the effects of the present invention cannot be impaired.

Examples

The present invention will now be illustrated as hereunder by Examples although the present invention is not limited thereto. Unless otherwise specified, the term simply reading "part(s)" in Examples stands for that/those by mass, and the term reading "%" in Examples stands for mass %. Each measurement was carried out in accordance with the following methods.

<Number-Average Molecular Weight (Mn)>

After a sample (polycarbonate polyol (A) or polyurethane resin) (4 mg) was dissolved in 4 mL of tetrahydrofuran (wherein 5 mM of tetrabutylammonium chloride was added), it was filtered through a membrane filter of 0.2 μm. The filtrate was used as a sample solution and analyzed by gel permeation chromatography. TOSOH HLC-8220 was used as an apparatus, and a differential refractive index detector was used as a detector. The measurement was conducted in a flow rate of 1 mL/minute and at a column temperature of 40° C. As to the standard for molecular weight, a monodispersed polystyrene was used. The number-average molecular weight was determined as a value converted into the standard polystyrene. Calculation was conducted by omitting the part corresponding to the molecular weight of less than 1000.

<Glass Transition Temperature (Tg)>

A temperature dependency of a dynamic viscoelasticity was measured. From the results of the measurement, a temperature corresponding to an inflection point of storage modulus (E') was defined as a glass transition temperature. More specifically, the resultant polyurethane resin solution was applied onto a polypropylene film ("P2161", manufactured by Toyobo Co., Ltd., thickness: 50 μm) at a wet film thickness (a thickness before being dried) of 200 μm, and the resultant product was heated at 120° C. for 1 hour to volatilize (dry) the solvent. Subsequently, a dried film of the polyurethane resin solution was detached from the polypropylene film to produce a polyurethane resin sample film. The glass transition temperature of the sample film was measured. As to a measurement device, a dynamic viscoelastic analyzer "DVA-220" manufactured by IT Keisoku Seigyo KK was used. The temperature dependency was measured at 0° C. to 150° C. (4° C./min, 10 Hz).

Production Example for Polyurethane Resin (U1)

Into a reaction vessel equipped with a thermometer, a stirrer, a reflux condenser and a distillation tube, UC-100 (polycarbonate diol manufactured by Ube Industries, Ltd.) (100 parts), neopentyl glycol (5 parts) and methyl ethyl ketone (MEK) (204 parts) were charged. These components were dissolved together. Subsequently, isophorone diisocyanate (31 parts) was introduced into the reaction vessel, and the resultant mixture was stirred to prepare a homogeneous solution. Subsequently, BiCAT8210 (manufactured by The Shepherd Chemical Company) (0.5 part) was added as a catalyst to the solution. The resultant solution was allowed to react at 75° C. for 5 hours. After the reaction was carried out sufficiently, methyl ethyl ketone (MEK) (113 parts) was introduced into the reaction vessel, and then the resultant solution was stirred to give a solution of a desired polyurethane resin (U1) having a solid concentration (NV) of 30 mass %. Properties of the polyurethane resin (U1) thus produced are shown in Table 1.

Production Examples for Polyurethane Resins (U2) to (U10)

The same procedure as in Production example for polyurethane resin (U1) was carried out, except that the types of raw materials and the blending ratio of the raw materials were changed. In this manner, polyurethane resins (U2) to (U10) were produced. Properties of these polyurethane resins are shown in Table 1.

Preparation of Laminate

A solution of the polyurethane resin (P1) was applied on a polycarbonate film (manufactured by Sumitomo Bakelite Co., Ltd., EC105, 0.5 mm) with a bar coater in such a manner that the dry film thickness (i.e., the thickness after being dried) became 5 μm, and then the resultant product was heated at 120° C. for 3 minutes to volatilize (dry) the solvent. Subsequently, a polycarbonate film (manufactured by Sumitomo Bakelite Co., Ltd., EC105, 0.5 mm) was bonded to a polyurethane resin-applied surface of the film by compression with a dry laminator (i.e., dry lamination). The dry lamination was carried out under the conditions of a roll temperature of 120° C., a roll load of 3 kg/cm, a compression target feeding rate of 1 m/min. Subsequently, the resultant product was aged at 80° C. for 1 hour to give a laminate.

Initial Adhesive Force (Adhesive Property) Test

The laminate was cut into strip-shaped specimens each having a width of 15 mm, and each of the strip-shaped specimens was peeled with Tensilon (registered tradename) (manufactured by Toyo Sokki Co., Ltd., UTM-IV) (T-type peeling, tensile speed: 100 mm/min.). The state of peeling was observed to evaluate the adhesive property of the specimens. Results of the evaluation are shown in Table 2.

(Evaluation)

○: Cohesive failure or material failure of the adhesive agent occurred.

Δ: Interfacial peeling occurred, and adhesion strength was 10 N/15 mm.

TABLE 1

| | | | polyurethane resin | | | | | | | | | |
|---|---|---|---|---|---|---|---|---|---|---|---|---|
| | | | U1 | U2 | U3 | U4 | U5 | U6 | U7 | U8 | U9 | U10 |
| resin composition | polyol component (mass ratio) | UC-100 | 100 | 100 | 100 | 100 | 100 | 100 | | | | |
| | | UH-100 | | | | | | | | 100 | | |
| | | PH-100 | | | | | | | | | 100 | |
| | | UM-90 (3/1) | | | | | | | 100 | | | |
| | | UM-90 (1/1) | | | | | | | | | | 100 |
| | organic diisocyanate compound (mass ratio) | IPDI | 31 | 30 | | | 29 | 36 | 31 | 31 | 31 | 31 |
| | | MDI | | | 33 | | | | | | | |
| | | HDI | | | | 35 | | | | | | |
| | chain extender (mass ratio) | NPG | 5 | | 5 | 5 | 5 | 7 | 5 | 5 | 5 | 5 |
| | | HD | | 5 | | | | | | | | |
| physical property | | solvent | MEK | MEK | MEK | MEK | MEK | MEK | MEK | MEK | MEK | MEK |
| | | NV (%) | 30 | 30 | 30 | 30 | 30 | 30 | 30 | 30 | 30 | 30 |
| | | number-average molecular weight | 18000 | 16000 | 15000 | 20000 | 12000 | 30000 | 19000 | 18000 | 17000 | 20000 |
| | | Tg (° C.) | 78 | 67 | 105 | 55 | 76 | 83 | 61 | 30 | 32 | 45 |

Examples 1 to 8 and Comparative Examples 1 to 3

Laminates were prepared using the polyurethane resins (U1) to (U10), respectively. Each of the laminates was subjected to the evaluation of an initial adhesive force (adhesive property) and heat resistance. With respect to Example 8, D-110N (manufactured by Mitsui Chemicals, Inc., solid concentration: 75 mass %) was added as a crosslinking agent in an amount of 4 parts by mass (3 parts by mass in terms of solid content) relative to 100 parts by mass (30 parts by mass in terms of solid content) of the polyurethane resin solution, and the evaluation was carried out using the resultant solution.

x: The adhesion strength was less than 10 N/15 mm.

Heat Resistance Test

Each of the laminates was treated by being left to stand at 105° C. for 300 hours, and was then subjected to the evaluation of adhesive property in the same manner as in the initial adhesive force test.

(Evaluation)

○○: No air gap was generated and cohesive failure or material failure of the adhesive agent occurred.

○: No air gap was generated and mainly cohesive peeling occurred, but interfacial peeling occurred partially.

Δ: No air gap was generated and the interfacial peeling occurred.

x: Air gaps were generated.

TABLE 2

|  |  |  | Example (1) | Example (2) | Example (3) | Example (4) | Example (5) | Example (6) | Example (7) | Example (8) | Comparative Example (1) | Comparative Example (2) | Comparative Example (3) |
|---|---|---|---|---|---|---|---|---|---|---|---|---|---|
| blending ratio | polyurethane resin solution | U1 | 100 |  |  |  |  |  |  | 100 |  |  |  |
|  |  | U2 |  | 100 |  |  |  |  |  |  |  |  |  |
|  |  | U3 |  |  | 100 |  |  |  |  |  |  |  |  |
|  |  | U4 |  |  |  | 100 |  |  |  |  |  |  |  |
|  |  | U5 |  |  |  |  | 100 |  |  |  |  |  |  |
|  |  | U6 |  |  |  |  |  | 100 |  |  |  |  |  |
|  |  | U7 |  |  |  |  |  |  | 100 |  |  |  |  |
|  |  | U8 |  |  |  |  |  |  |  |  | 100 |  |  |
|  |  | U9 |  |  |  |  |  |  |  |  |  | 100 |  |
|  |  | U10 |  |  |  |  |  |  |  |  |  |  | 100 |
|  | crosslinking agent | D-110N |  |  |  |  |  |  |  | 4 |  |  |  |
| property | adhesive property |  | ○ | ○ | ○ | △ | ○ | ○ | ○ | ○ | x | x | △ |
|  | heat resistance |  | ○ | △ | △ | △ | ○ | ○ | △ | ○○ | x | x | x |

The compounds used in Tables 1 and 2 are as follows.

UC-100: a polycarbonate diol based on 1,4-cyclohexanedimethanol, which is manufactured by Ube Industries, Ltd., the number-average molecular weight=1000, the content ratio of the structure represented by the general formula (1) in the polycarbonate polyol(A): 100 mol %

UH-100: a polycarbonate diol based on 1,6-hexanediol, which is manufactured by Ube Industries, Ltd., the number-average molecular weight=1000, the content ratio of the structure represented by the general formula (1) in the polycarbonate polyol(A): 0 mol %

PH-100: a polycarbonate diol based on 1,6-hexanediol and 1,5-pentanediol, which is manufactured by Ube Industries, Ltd., the number-average molecular weight=1000, the content ratio of the structure represented by the general formula (1) in the polycarbonate polyol(A): 0 mol %

UM-90 (3/1): a polycarbonate diol based on 1,4-cyclohexanedimethanol and 1,6-hexanediol, which is manufactured by Ube Industries, Ltd., the number-average molecular weight=900, the content ratio of the structure represented by the general formula (1) in the polycarbonate polyol(A): 75 mol %

UM-90 (1/1): a polycarbonate diol based on 1,4-cyclohexanedimethanol and 1,6-hexanediol, which is manufactured by Ube Industries, Ltd., the number-average molecular weight=900, the content ratio of the structure represented by the general formula (1) in the polycarbonate polyol(A): 50 mol %

D-110N: a trimethylolpropane adduct of meta-xylylene diisocyanate, which is manufactured by Mitsui Chemicals, Inc., the solid content ratio: 75 mass %

IPDI: isophorone diisocyanate
MDI: diphenylmethane diisocyanate
HDI: hexamethylene diisocyanate
NPG: neopentyl glycol
HD: 1,6-hexanediol

The invention claimed is:

1. A polyurethane resin containing, as copolymerization components, a polycarbonate polyol (A), an organic diisocyanate (B) and a chain extender (C),
   wherein the polycarbonate polyol (A) contains a structure represented by the following general formula (1) in an amount of 60 mol % or more,
   wherein a copolymerization content of the organic diisocyanate (B) is 1 part by mass or more and 50 parts by mass or less, relative to 100 parts by mass of the polycarbonate polyol (A),
   wherein the chain extender (C) is a polyol compound, and
   wherein a glass transition temperature of the polyurethane resin is 50° C. or higher,

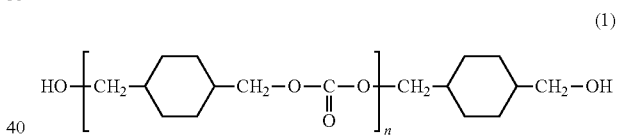

wherein in general formula (1), n represents an integer of 1 to 20.

2. The polyurethane resin according to claim 1, wherein the organic diisocyanate (B) is isophorone diisocyanate, 4,4'-diphenylmethane diisocyanate or hexamethylene diisocyanate.

3. The polyurethane resin according to claim 1, wherein the chain extender (C) is a glycol compound having 10 or less carbon atoms.

4. An adhesive composition comprising the polyurethane resin according to claim 1 and a crosslinking agent.

5. A binder for screen inks comprising the polyurethane resin according to claim 1 and a crosslinking agent.

6. A binder for decorative molding comprising the polyurethane resin according to claim 1 and a crosslinking agent.

* * * * *